United States Patent
Sukalski et al.

(10) Patent No.: US 12,098,946 B2
(45) Date of Patent: *Sep. 24, 2024

(54) FORKLIFT SCALE ATTACHMENT

(71) Applicant: Illinois Tool Works Inc., Glenview, IL (US)

(72) Inventors: Andrew James Sukalski, Fairmont, MN (US); Thomas Howard Johnson, Winnebago, MN (US); Scott Ray Janssen, Fairmont, MN (US)

(73) Assignee: Illinois Tool Works Inc., Glenview, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/085,843

(22) Filed: Dec. 21, 2022

(65) Prior Publication Data
US 2023/0119900 A1    Apr. 20, 2023

Related U.S. Application Data

(63) Continuation of application No. 16/825,843, filed on Mar. 20, 2020, now Pat. No. 11,536,603.
(Continued)

(51) Int. Cl.
*G01G 19/08* (2006.01)
*B66F 9/075* (2006.01)
*B66F 17/00* (2006.01)

(52) U.S. Cl.
CPC ....... *G01G 19/083* (2013.01); *B66F 9/07504* (2013.01); *B66F 17/003* (2013.01)

(58) Field of Classification Search
CPC ...... B66F 17/003; B66F 9/07504; B66F 9/14; B66F 9/12; B66F 9/08; B66F 9/22; G01G 19/083; G01G 23/3728
(Continued)

(56) References Cited

U.S. PATENT DOCUMENTS

| 3,738,512 A | 6/1973 | Marsden |
| 4,323,132 A | 4/1982 | Bradley |

(Continued)

FOREIGN PATENT DOCUMENTS

| AU | 2011235575 | 11/2012 |
| CN | 102007387 | 4/2011 |

(Continued)

OTHER PUBLICATIONS

Int'l Search Report and Written Opinion Appln No. PCT/US2020/024134 mailed Jun. 30, 2020.

*Primary Examiner* — Gregory W Adams
(74) *Attorney, Agent, or Firm* — McAndrews, Held & Malloy, Ltd.

(57) ABSTRACT

The present disclosure describes a lift truck attachment system that includes a lift truck carriage with an upper carriage support and a lower carriage support secured between two support brackets. The lift truck carriage is dimensioned to fit at least partially between opposing masts of a lift truck, such that the upper and lower carriage supports do not extend substantially beyond a forward surface of the mast. A device assembly, is mounted to the lift truck carriage, the device assembly including a base portion removably secured to the upper and/or lower carriage supports via one or more attachments. The device assembly can include a carriage scale removably secured to the base portion, the carriage scale configured to support load handling fixtures, such as a lift fork. In some examples, a single carriage support is used.

20 Claims, 11 Drawing Sheets

Related U.S. Application Data

(60) Provisional application No. 62/823,347, filed on Mar. 25, 2019.

(58) Field of Classification Search
 USPC .......................................................... 187/234
 See application file for complete search history.

(56) References Cited

U.S. PATENT DOCUMENTS

| | | | | |
|---|---|---|---|---|
| 4,421,186 | A | | 12/1983 | Bradley |
| 4,632,620 | A | * | 12/1986 | Wiggers ............... B65G 57/303 |
| | | | | 187/222 |
| 6,002,090 | A | | 12/1999 | Johnson |
| 7,101,139 | B1 | * | 9/2006 | Benedict ................... B66B 9/00 |
| | | | | 180/7.1 |
| 7,195,105 | B2 | * | 3/2007 | Tygard ...................... B66F 9/08 |
| | | | | 187/230 |
| 9,073,738 | B2 | | 7/2015 | Johnson |
| 11,536,603 | B2 | * | 12/2022 | Sukalski .............. G01G 19/083 |
| 2014/0299418 | A1 | * | 10/2014 | Meijer ...................... B66F 9/12 |
| | | | | 187/234 |
| 2017/0129754 | A1 | | 5/2017 | Pangrazio |

FOREIGN PATENT DOCUMENTS

| | | |
|---|---|---|
| CN | 104229679 | 12/2014 |
| DE | 102008050204 | 4/2010 |
| JP | 2000095496 | 4/2000 |
| WO | 2010091219 | 8/2010 |

\* cited by examiner

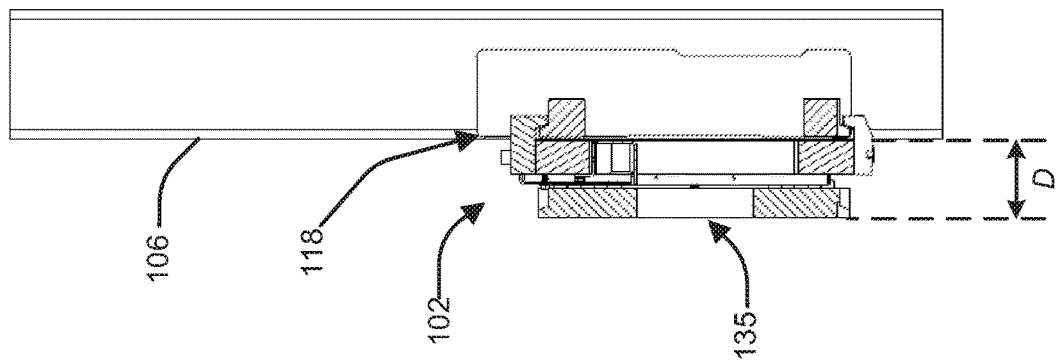
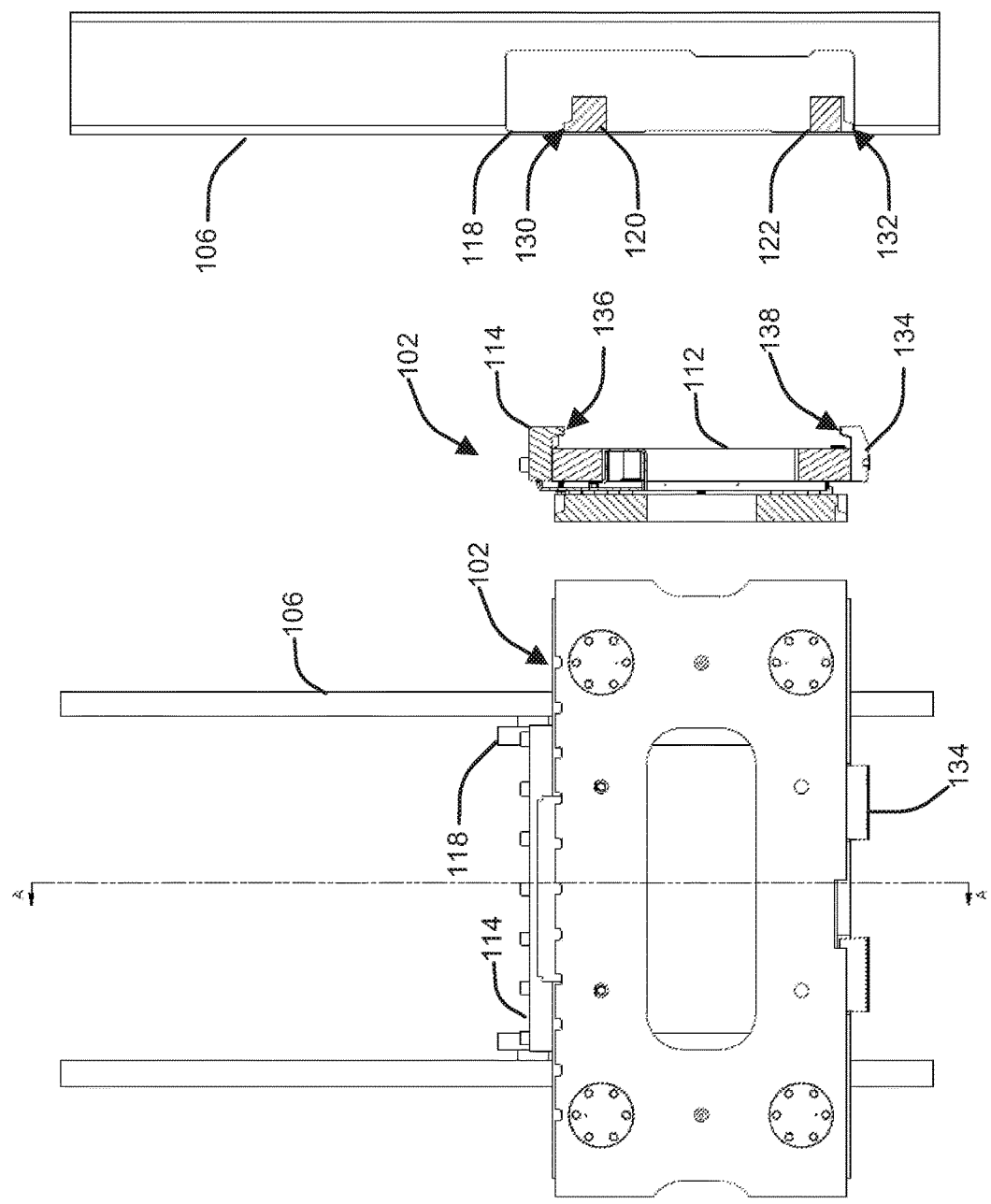
FIG. 4A  FIG. 4B  FIG. 4C

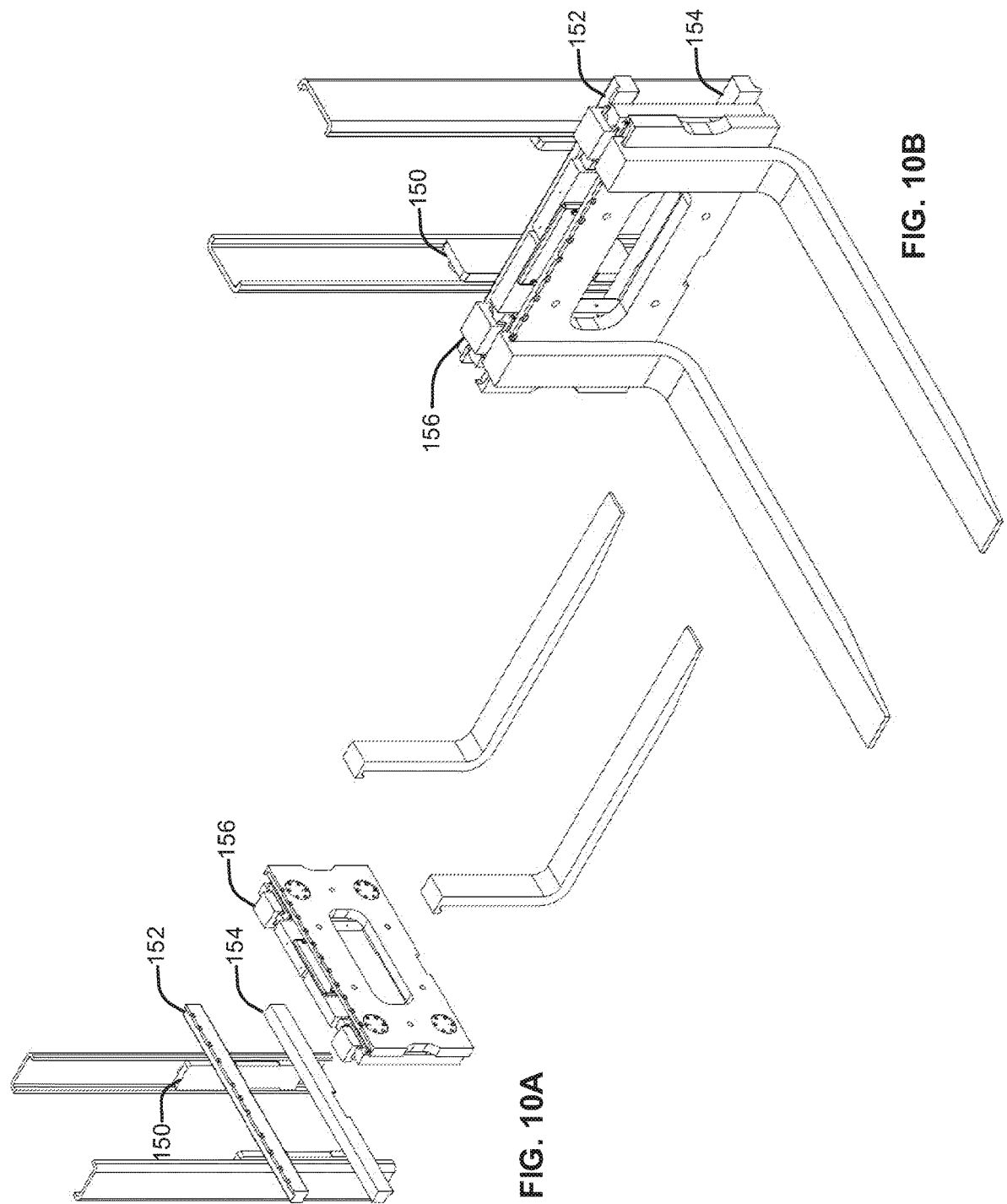

FORKLIFT SCALE ATTACHMENT

CROSS REFERENCE TO RELATED APPLICATIONS

This application is a continuation of U.S. patent application Ser. No. 16/825,843 entitled "Forklift Scale Attachment" filed Mar. 20, 2020, which is a Non-Provisional patent application of U.S. Provisional Patent Application No. 62/823,347 entitled "Forklift Scale Attachment" filed Mar. 25, 2019, both of which are herein incorporated by reference in their entirety.

BACKGROUND

Attachments to lift trucks can be added to a standard carriage that normally carries the lifting forks. This offsets the position of the lifting forks an additional distance from the front of the lift truck, extending the profile of the lift truck and potentially reducing the lifting capacity of the lift truck. Some attachments can include a scale to measure a load of a lift truck scale. However, additional attachments can further extend the profile of the lift truck, reduce the lift capacity, and make removal and/or repair of the scale difficult.

Accordingly, there is a need for an attachment to be mounted to a lift truck that reduces the profile of the attachment and an associated device that is easy to install and remove.

SUMMARY

Disclosed is a lift truck attachment system that includes a lift truck carriage. The lift truck carriage includes one or more support brackets, an upper carriage support secured to the one or more support brackets, and a lower carriage support secured to the one or more support brackets and spaced from the upper carriage support, wherein the lift truck carriage is dimensioned to fit at least partially between masts of a lift truck. A weighing device includes a base portion configured to be removably secured to one of the upper or lower carriage supports of the lift truck carriage via one or more attachments. A carriage scale is removably secured to the base portion, the carriage scale configured to support one or more load handling fixtures.

In some examples, the one or more attachments extend into a space between the masts of the lift truck to secure the weighing device to the lift truck carriage.

In examples, the one or more attachments comprises an upper attachment and a lower attachment, the upper attachment including a hook to mate with a rail of the upper carriage support to support the weighing device.

In some examples, the lower attachment including a hook to mate with a rail of the lower carriage support.

In some examples, the hook of the lower attachment is oriented upward to mate with a downwardly oriented rail of the lower carriage support In some examples, the hook of the lower attachment is oriented downward to mate with an upwardly oriented rail of the lower carriage support In some examples, the one or more attachments are secured to the base by one or more fasteners.

In some examples, the one or more attachments are secured to the base by a weld.

In some examples, the one or more support brackets are dimensioned to fit at least partially within a channel of the masts.

In some disclosed examples, a lift truck attachment system includes a lift truck carriage. The lift truck carriage includes one or more support brackets, a carriage support secured to the one or more support brackets, wherein the lift truck carriage is dimensioned to fit at least partially between masts of a lift truck. A weighing device includes a base portion configured to be removably secured to the carriage support of the lift truck carriage via one or more attachments. A carriage scale is removably secured to the base portion, the carriage scale configured to support one or more load handling fixtures wherein the one or more attachments extend into a space between the masts of the lift truck to secure the weighing device to the lift truck carriage.

In some disclosed examples, a lift truck attachment system includes a lift truck carriage. The lift truck carriage includes one or more support brackets, an upper carriage support secured to the one or more support brackets, and a lower carriage support secured to the one or more support brackets and spaced from the upper carriage support, wherein the lift truck carriage is dimensioned to fit at least partially between masts of a lift truck. A weighing device includes a base portion, the base portion configured to be removably secured to one of the upper or lower carriage supports of the lift truck carriage via two or more upper fasteners and one or more lower fasteners. And a carriage scale removably secured to the base portion, the carriage scale configured to support one or more load handling fixtures.

In some examples, the two or more upper fasteners and one or more lower fasteners extend into a space between the masts of the lift truck to secure the weighing device to the lift truck carriage. In some examples, the two or more upper fasteners and one or more lower fasteners are secured to the base by one or more fasteners oriented through one or more holes in the front of the base.

In some examples, the two or more upper fasteners are arranged on the base to accommodate one or more of wiring, electronics, centering pins, information or identification plates for the carriage scale. In some examples, the two or more upper fasteners include a hook to mate with a rail of the upper carriage support to support the weighing device.

In some examples, the one or more lower fasteners includes a hook to mate with a rail of the lower carriage support. In some examples, the hook of the or the one or more lower fasteners is oriented upward to mate with a downwardly oriented rail of the lower carriage support.

In some examples, the one or more support brackets are dimensioned to fit within a channel of the masts.

These and other features and advantages of the present invention will be apparent from the following detailed description, in conjunction with the appended claims.

BRIEF DESCRIPTION OF THE DRAWINGS

The benefits and advantages of the present invention will become more readily apparent to those of ordinary skill in the relevant art after reviewing the following detailed description and accompanying drawings, wherein:

FIG. 4A is a front view of the example lift truck attachment system of FIG. 1, in accordance with aspects of this disclosure.

FIGS. 4B and 4C are side views of the example lift truck attachment system of FIG. 1, in accordance with aspects of this disclosure.

FIG. 10A is an exploded front perspective view of a conventional lift truck attachment.

FIG. 10B is a front perspective view of a conventional lift truck attachment.

The figures are not necessarily to scale. Where appropriate, similar or identical reference numbers are used to refer to similar or identical components.

DETAILED DESCRIPTION

The present disclosure describes a lift truck attachment system. In some examples, the system includes a lift truck carriage having one or more support brackets, with an upper carriage support and a lower carriage support secured between two support brackets. As disclosed herein, the lift truck carriage is dimensioned to fit at least partially between opposing masts of a lift truck, such that a profile extension of the upper and lower carriage supports is reduced relative to conventional systems. In some examples, the lift carriage does not extend beyond a forward surface of the masts.

A device assembly is to be mounted to the lift truck carriage. The device assembly includes a base portion configured to be removably secured to one or both of the upper and lower carriage supports via one or more attachments. The device assembly also includes a device, such as a carriage scale, which is removably secured to the base portion, the device configured to support one or more load handling fixtures, such as a lift fork.

In some examples, the two carriage supports are spaced apart from one another. In some examples, a single carriage support is used.

The disclosed lift truck attachment system provides advantages over conventional lift truck designs by enabling devices (i.e. a weighing device, a side-shifter, etc.) to be attached to the lift truck via a device assembly with a reduced profile extension, as well as minimal loss in lifting capacity due to offsetting of the load (e.g., extending the load away from the front wheel axis of the lift truck). As shown in the several figures, the lift attachment device is secured to the lift carriage between upper and lower carriage supports, which are dimensioned to fit substantially between the lift truck masts (e.g., within a channel thereof), in order to reduce the effective distance between the lift truck mast and a load and/or the load carrying fixtures, such as loading forks.

As disclosed herein, a device, such as a weighing device (e.g., a forklift scale) and/or a side-shifter, is secured to a lift carriage via one or more attachments. Thus, the device assembly is supported by the lift carriage, which substantially fits within a channel of the truck mast such that a profile extension of the lift carriage is reduced relative to conventional systems. In some examples, the lift carriage does not extend beyond a forward edge of the truck masts. Accordingly, the disclosed lift truck attachment provides the device assembly secured between the upper and lower carriage supports to reduce the effective distance between the lift truck masts and the load carrying fixtures, such as loading forks.

Advantageously, mounting of the disclosed attachment and lift carriage supports, by fasteners and/or downward forces acting on mating surfaces, is simplified versus other methods, such as welding. The disclosed system allows for easy mounting and decoupling.

Figure 1:
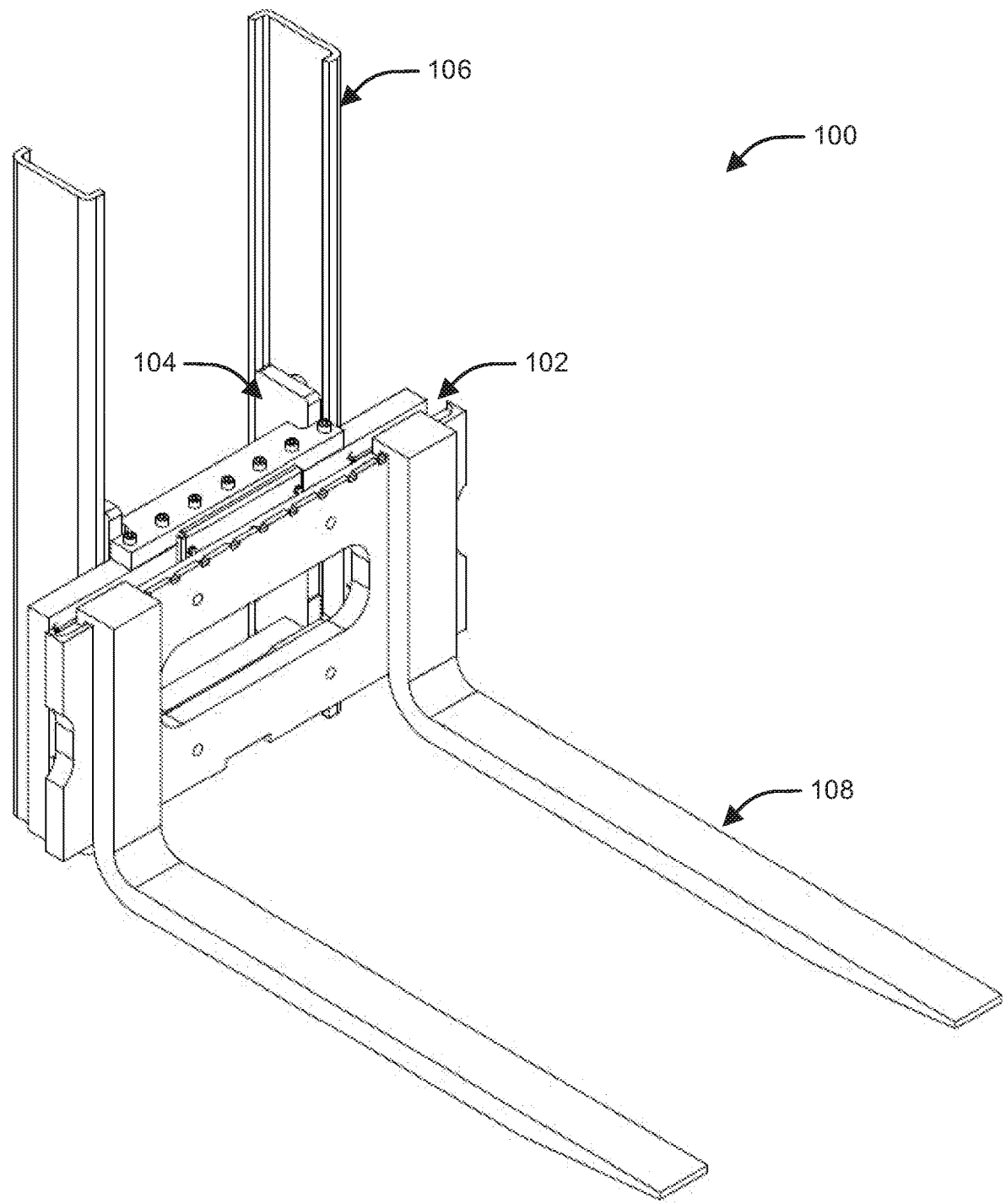
FIG. 1 is a perspective illustration of an example lift truck attachment system, in accordance with aspects of this disclosure.

FIG. 1 illustrates an example lift truck attachment system 100, in accordance with aspects of this disclosure. For example, masts 106 are supported by a lift truck (not shown), which allow a lift truck carriage 104 to move via a mechanical lift in response to a user command. As disclosed herein, a weighing device 102 is mounted to the carriage 104, and configured to support one or more forks or load handling fixtures 108. Thus, an operator can command the lift truck attachment system 100 to raise and/or lower to manipulate a load.

Figure 2:
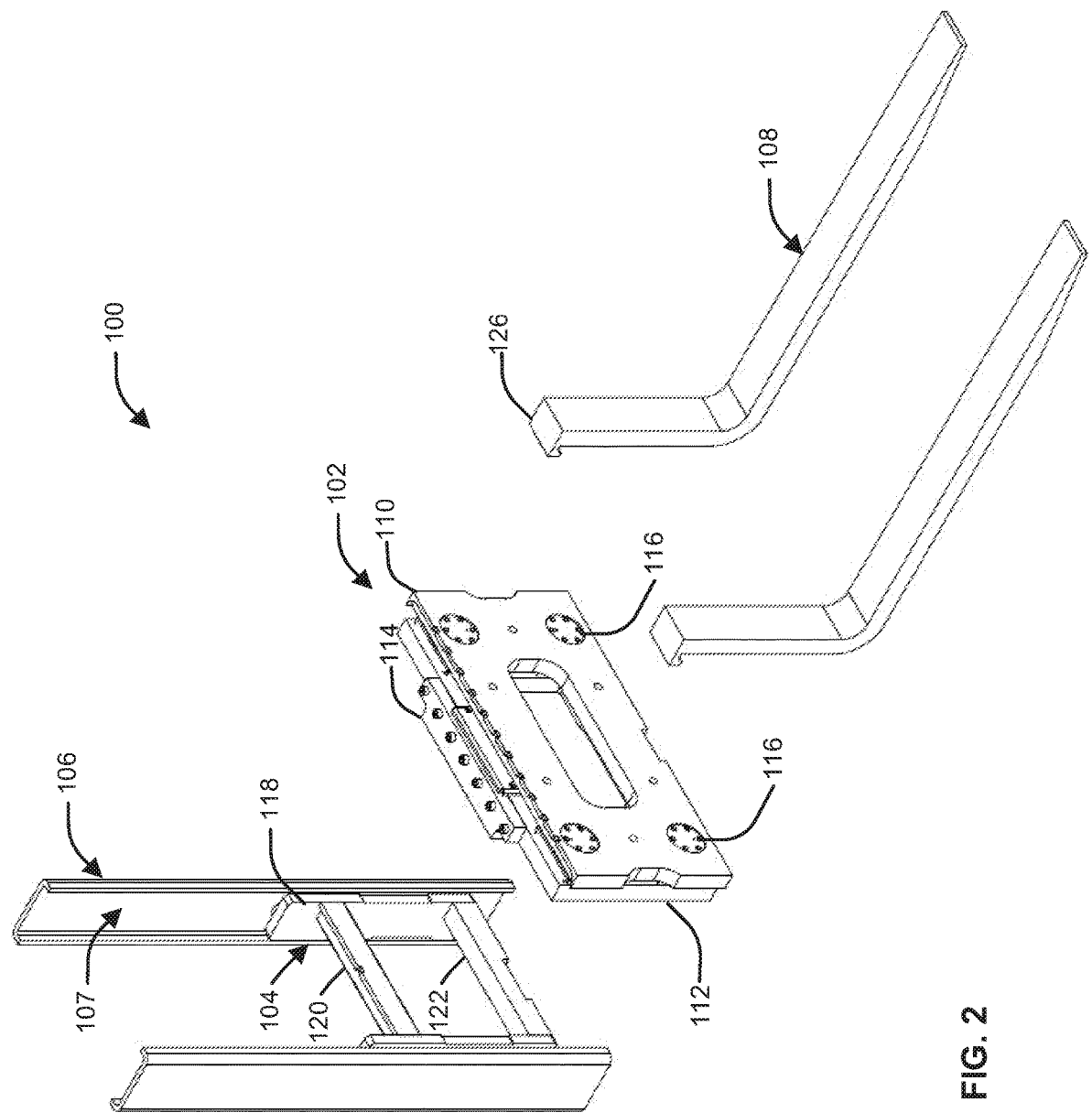
FIG. 2 is an exploded view of the example lift truck attachment system of FIG. 1, in accordance with aspects of this disclosure.

FIG. 2 is an exploded view of the example lift truck attachment system 100. As shown, the carriage 104 includes support brackets 118 that fit within a channel 107 of the masts 106. In some examples, the support brackets 118 are mounted flush against the masts 106, with or without a channel, and controlled to rise and/or lower in response to a mechanical force (e.g., from a connected chain, hydraulic, etc.). Between the support brackets 118 are one or more cross members to support the weighing device 102. As shown in the example of FIG. 2, the one or more cross members can include an upper carriage support 120 and/or a lower carriage support 122. Thus, the carriage 104 is configured to nest within the dimensions of the masts 106, such that support brackets 118 and/or upper and lower carriage supports 120, 122 do not extend beyond a front edge of the masts 106. Thus, in contrast to conventional systems, the example lift truck attachment system 100 maintains a smaller profile beyond the front edge of the masts 106.

The upper and lower carriage supports 120, 122 can provide one or more fasteners and/or mounting mechanisms to accept and/or secure the weighing device 102. In some examples, the weighing device 102 includes an upper attachment plate 114 configured to rest on upper carriage support 120, thereby supporting the weight of the weighing device 102 and/or forks 108. In examples, the upper attachment 114 can function as a simply supported beam on the upper carriage support 120, facilitating easy installation and removal, as well as added stability during use. As shown, upper attachment 114 can include notches and/or other features to ensure the mating portion of the upper attachment 114 fits within a space between masts 106. In some examples, a lower attachment plate can be employed to provide additional stability (see, e.g., FIGS. 4 and 5). In some examples, other methods or mechanism can be employed to secure the weighing device 102 to the carriage 104, such as bolts and/or welding.

As disclosed herein, the weighing device 102 can include a base 112, such as a plate configured to support a carriage scale 110. The carriage scale 110 can include one or more load cells 116 to sense a supported load, with the carriage scale 110 secured to the base 112 by the one or more load cells 116. When assembled, forks 108 are supported by mating hook/attachment 126 with a top ridge of the carriage scale 110, thereby enabling the carriage scale 110 to weigh a load on the forks 108. Thus, the weight of a load supported by the forks 108 is sensed by the one or more load cells 116. Although examples are provided with four load cells 116, any number of load cells may be employed, such as two load cells (e.g. arranged at opposing ends of the weighing device 102), or a single load cell (e.g. arranged at a central position of the weighing device 102). Further, five or more load cells may be used, to support a particular application.

In some examples, one or more load cells 116 are configured to measure the shear force between the base 112 and the carriage scale 110. Devices and/or components (not shown) may be connected to provide signals corresponding to the output from the load cell(s) 116 for analysis, display, and/or recordation, for instance.

Additionally or alternatively, the carriage support between the support brackets 118 is a single cross member or plate to receive the weighing device 102.

In some examples, information regarding the sensed load is provided to a computing platform for analysis, display, recordation, etc. For example, a processor can be configured to receive and translate information from the one or more load cells 116 into a digital format, for display to an operator, to store in memory, transmission to another computing platform, such as a central repository. In some examples, the weighing device 102 may include a computing platform, to perform all or part of these processing functions. In some examples, the weighing device 102 may include a wired and/or wireless transceiver to transmit information to another device for processing.

Figure 3B:
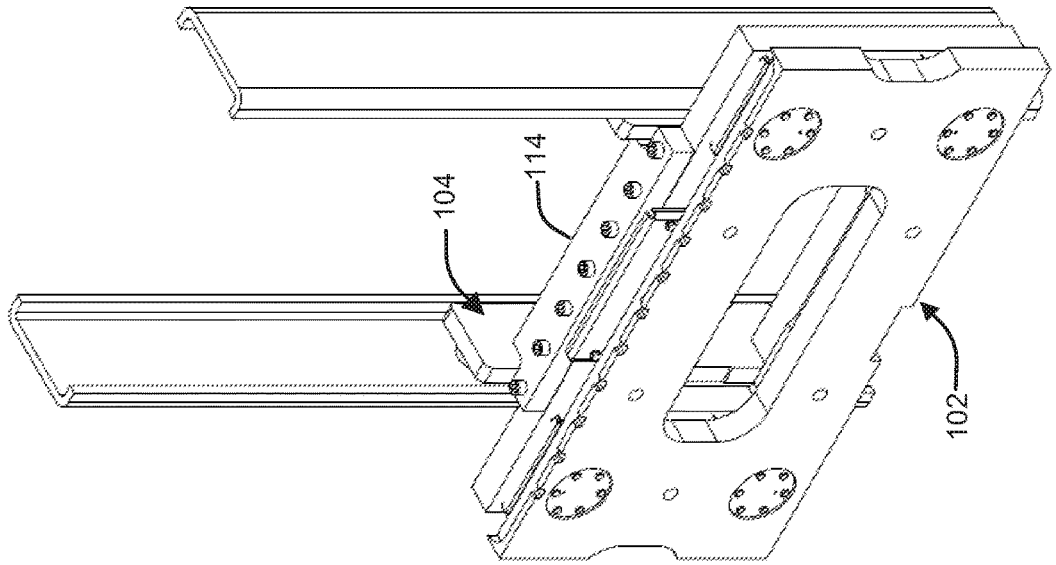
FIGS. 3A and 3B are alternative perspective views of the example lift truck attachment system of FIG. 1, in accordance with aspects of this disclosure.
Figure 3A:
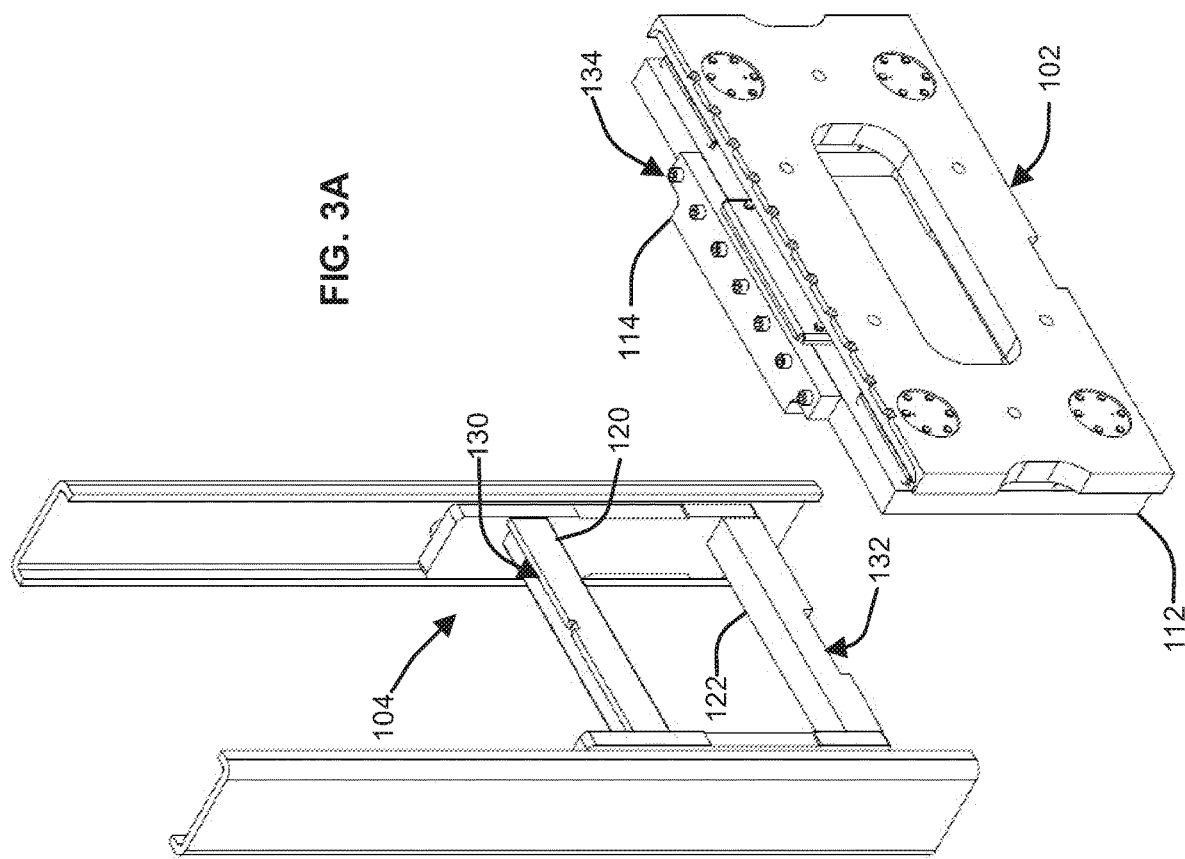

FIGS. 3A and 3B are alternative perspective views of the example lift truck attachment system of FIG. 1. In the example of FIG. 3A, the upper carriage support 120 has a support rail or ridge 130 on an upper surface to mate with attachment 114. The attachment 114 can be secured to the base 112 by one or more fasteners 134 and/or by other securing methods and/or mechanisms, such as welding. The lower carriage support 122 can optionally include an internal groove 132 on the underside, which can provide clearance to facilitate installation of one or more attachments to further secure the weighing device 102 to the carriage assembly 104. In some examples, the lower carriage support 122 can include a support rail or ridge to accept an attachment.

FIG. 3B illustrates the weighing device 102 mounted to the carriage 104. As shown, the attachment 114 is designed to extend into the space between the masts 106, thereby limiting the distance between the front edge of the masts 106 and the base 112. Such an arrangement provides a lower profile for the lift truck attachment system 100 versus conventional designs (e.g., shown in FIGS. 10 and 11), where support mounts extend beyond the front edge of the masts. As shown in the disclosed examples, the load bearing portion of the carriage supports 120, 122 are substantially located between the masts 106. For example, the attachment 114 interfaces directly with upper carriage support 120, such that device mounting cross-members on the surface of the masts 106 are avoided (see, e.g., FIGS. 10-11).

FIG. 4A is a front view of the example lift truck attachment system of FIG. 1. As shown, a lower attachment 134 is included to provide additional stability to the welding device 102 when mounted to the carriage 104.

FIG. 4B illustrates a side view of the unassembled weighing device 102 and masts 106, with support brackets 118 shown arranged between the masts 106, such as within the channel 107. As shown, upper attachment 114 has a hook or ridge 136 to mate with support rail 130 of the upper carriage support 120. Lower attachment 134 has a hook or ridge 138 to mate with support rail 132 of lower carriage support 122.

Although illustrated as having mating ridges/hooks, the carriage supports and/or attachments may be configured with additional or alternative mounting features, such as bolts and/or pins, such that the weighing device 102 is mounted directly to a carriage support.

In some examples, one or more of the attachment features (130, 132, 134, 136) include a preloaded connection (such as a spring, bolt, pin, etc.) to absorb shock and/or to bias the mating surfaces toward one another, resulting in a force to maintain constant contact. In some examples, a shape of the mating surface can be modified to achieve a desired performance result. Such modifications can include a cast ball-shaped interface, mating V-shaped contacts, grooves, ridges, etc.

As shown FIG. 4C, when assembled, the upper and lower attachments 114, 134 extend into the space between the masts 106 to mate with the upper and lower carriage supports 120, 122 located between the masts 106. Thus, the effective distance between the lift truck masts 106 and the external facing surface 135 of the weighing device 102 is reduced, as shown by distance D, in contrast to conventional attachments (see, e.g., FIG. 11B).

Additionally or alternatively, one or more of the lower attachment rails 138 and ridge 132 of the lower carriage support can be reversed, such that the lower attachment 134 becomes load bearing. In some examples, a retaining device can be mounted to the weighing device 102 and/or one of the carriage supports 120, 122, to prevent the weighing device 102 from inadvertently dislodging from the carriage 104.

Figure 5:
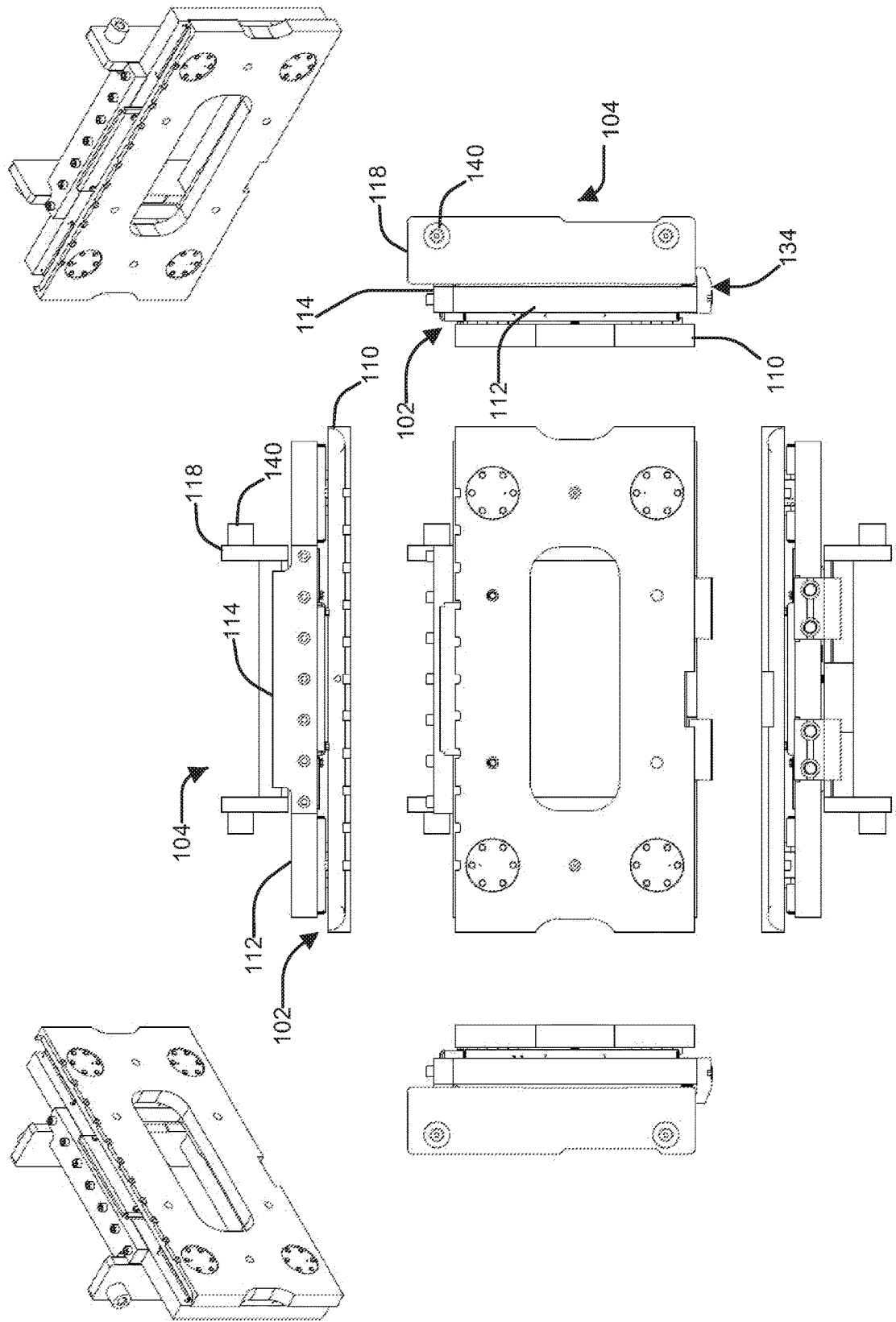
FIG. 5 is a front view, side views, and perspective front views of the example lift truck attachment system of FIG. 1, in accordance with aspects of this disclosure.
Figure 6:
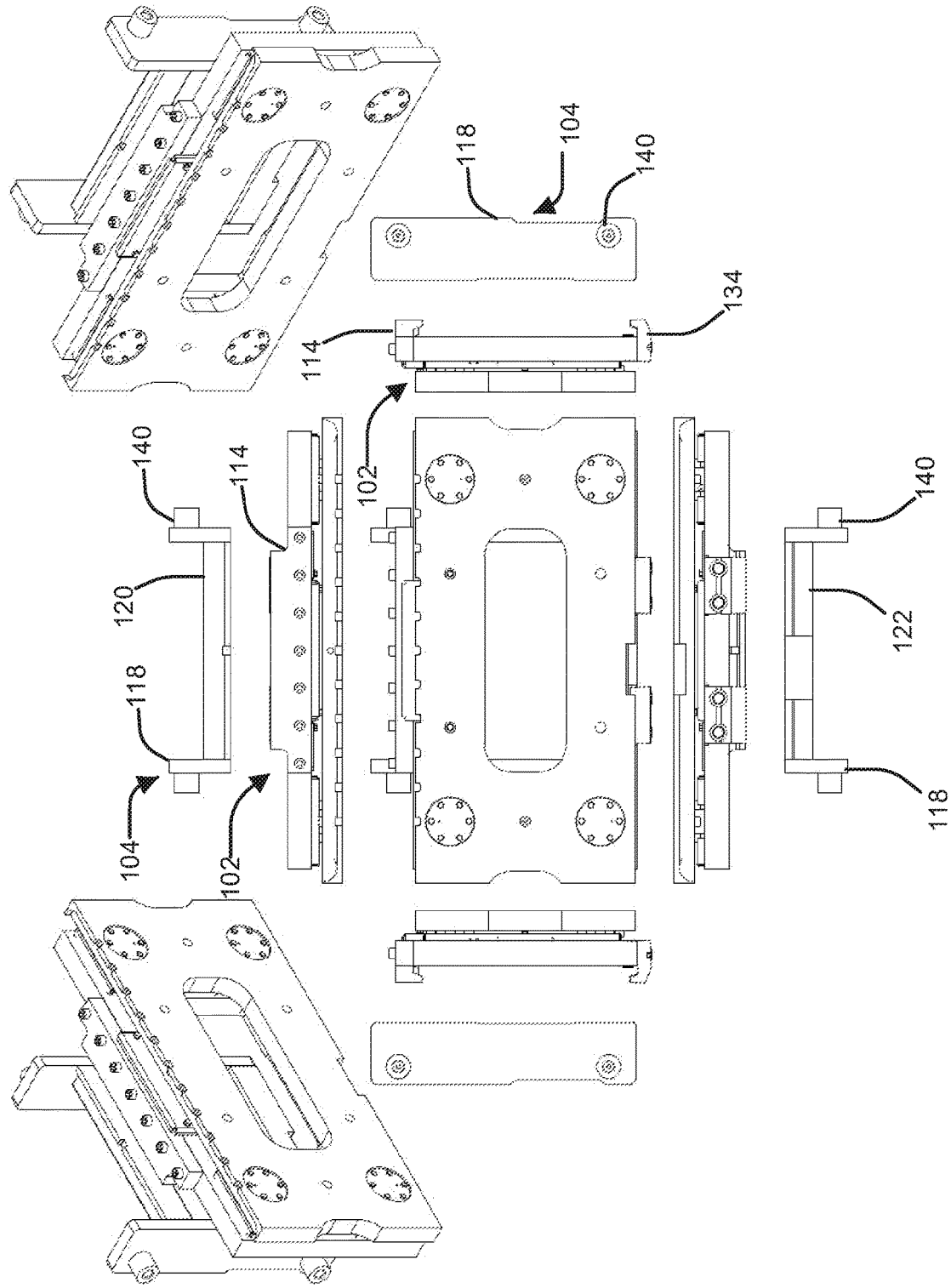
FIG. 6 is a front view, side views, and perspective front views of the example lift truck attachment system of FIG. 1, in accordance with aspects of this disclosure.

FIG. 5 is a front view of the weighing device 102 mounted to the carriage 104. Top, bottom, side, and two perspective front views are also provided. As shown, carriage support brackets 118 include one or more lifting mechanisms 140 to support the carriage 104 within the masts 106, which can be attached to a chain or other system to rise and/or lower the forks 108. FIG. 6 illustrates a front view of the weighing device 102 removed from the carriage 104.

Figure 7:
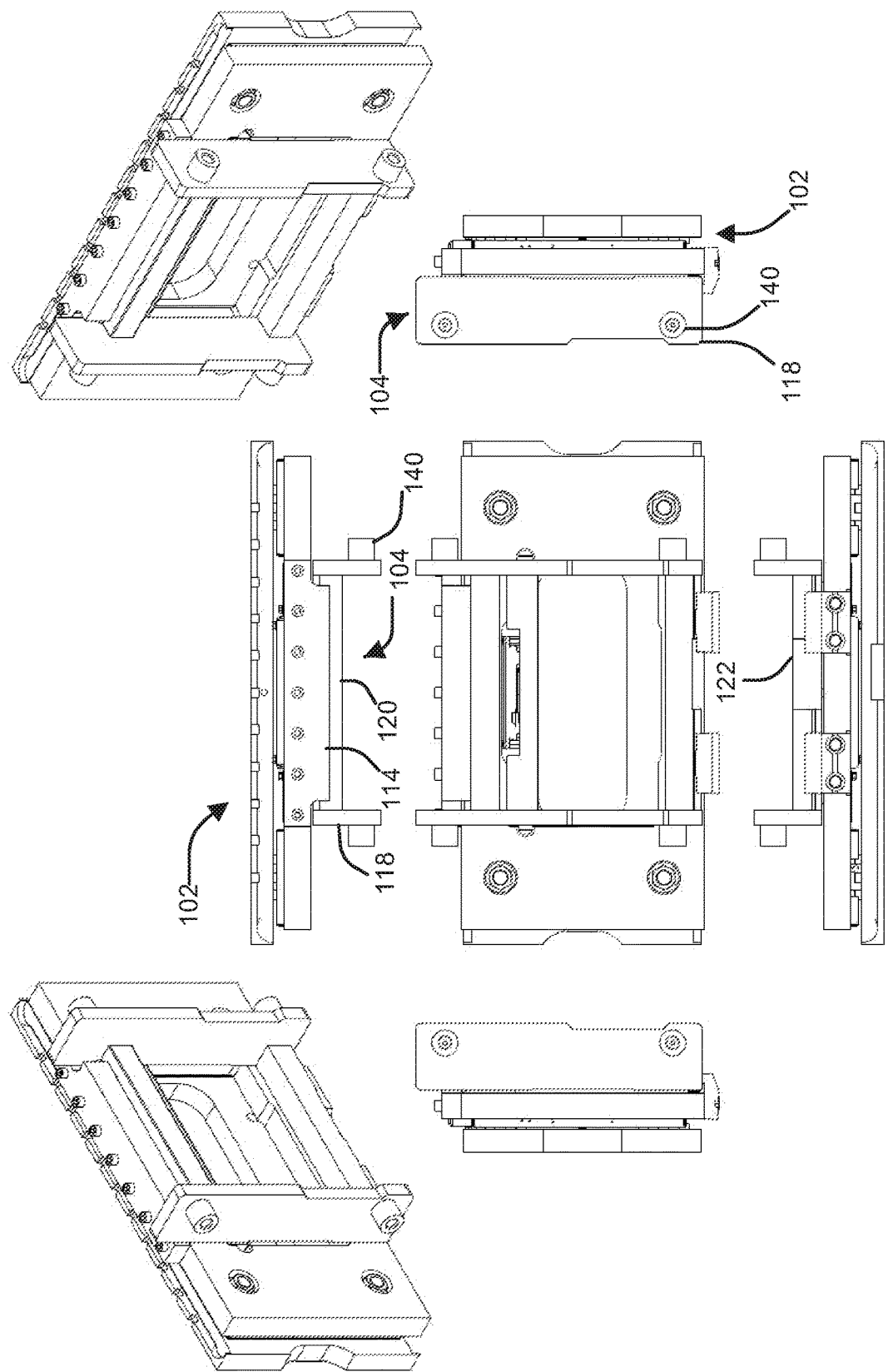
FIG. 7 is a rear view, side views, and perspective rear views of the example lift truck attachment system of FIG. 1, in accordance with aspects of this disclosure.
Figure 8:
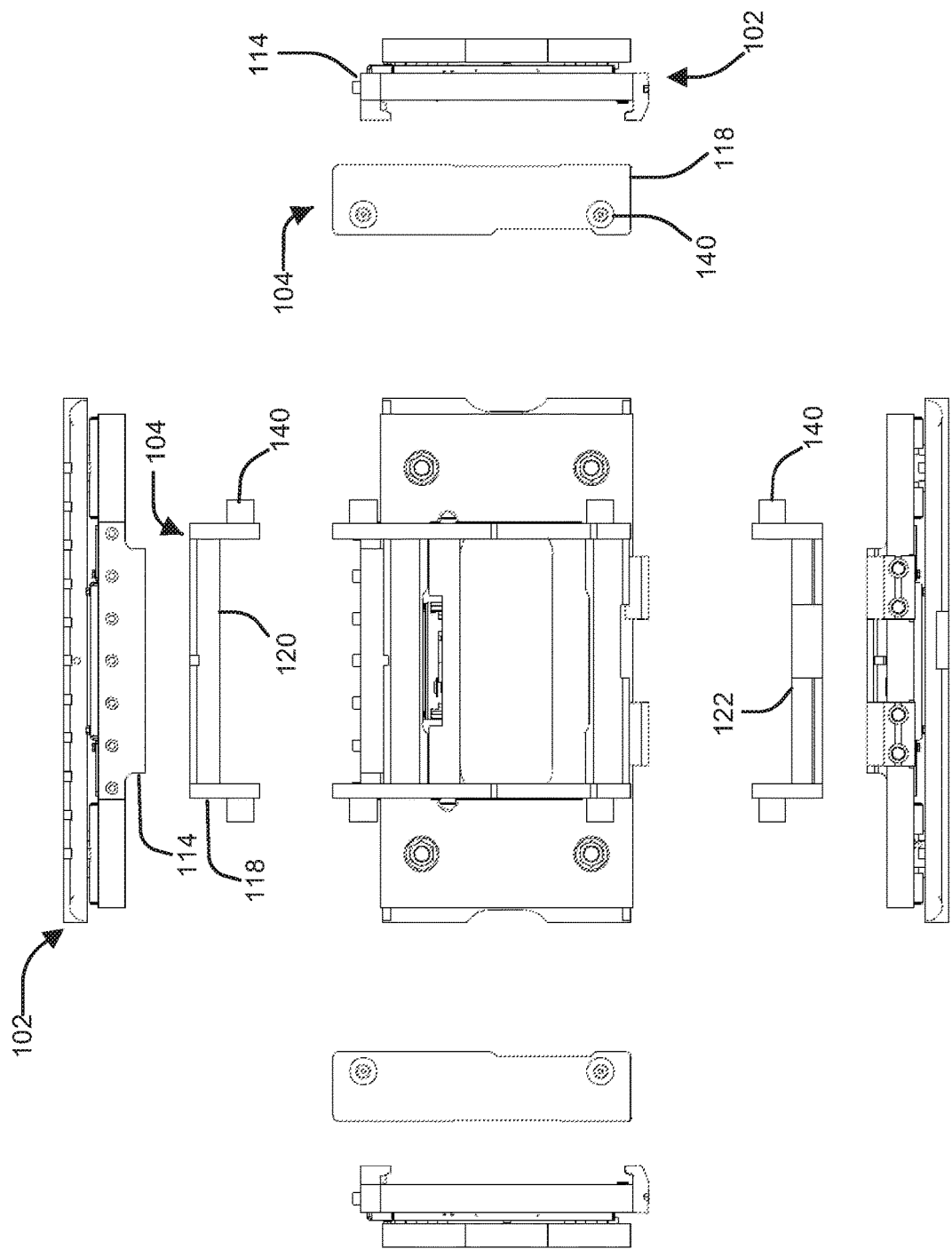
FIG. 8 is a rear view and side views of the example lift truck attachment system of FIG. 1, in accordance with aspects of this disclosure.

FIG. 7 is a rear view of the weighing device 102 mounted to the carriage 104. Top, bottom, side, and two perspective rear views are also provided. FIG. 8 illustrates a rear view of the weighing device 102 removed from the carriage 104.

Figure 9:
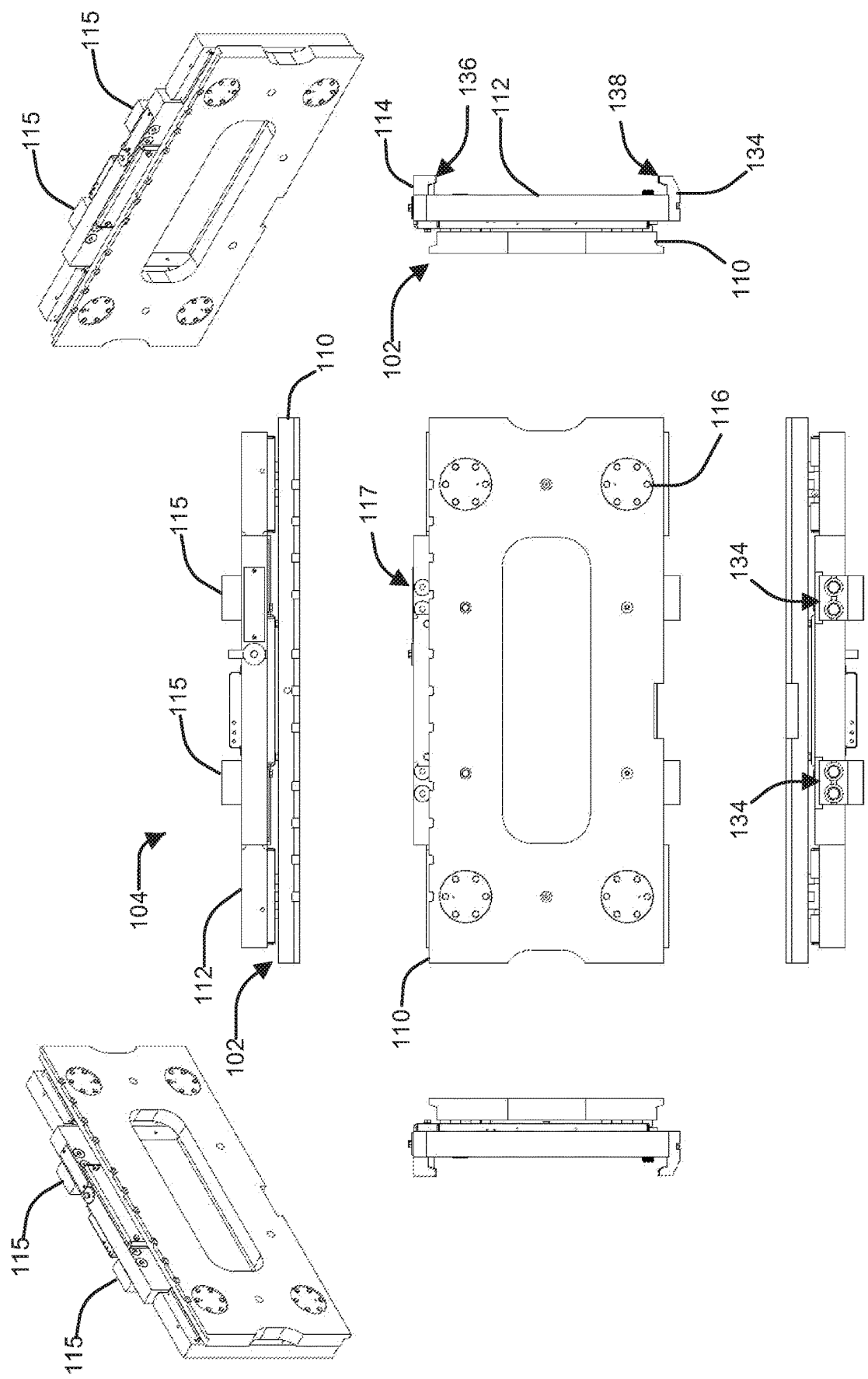
FIG. 9 is a front view, side views, and perspective front views of the example lift truck attachment system of FIG. 1, in accordance with aspects of this disclosure.

FIG. 9 is a front view of the weighing device 102 removed from the carriage 104, similar to the device illustrated in FIG. 6. However, as shown in FIG. 9, the upper attachment plate 114 shown in FIG. 6 is replaced by one or more fasteners 115 (e.g., hooks, bolts, etc.). As shown, fasteners 115 can be secured to the base 112 via one or more bolts 117 from a variety of angles or directions. For example, the bolts 117 shown in FIG. 9 secure the fastener 115 via machined holes on the front of the base 112 rather than from the top (e.g., such as upper attachment plate 114). Fasteners 115 may be smaller than upper attachment plate 114, such that they can be arranged to accommodate various features of the load cell 102, for instance. In the example of FIG. 9, two fasteners 115 are separated by a distance similar to lower attachment 135, which may be at the same or at different heights relative to the base 112. This arrangement of fasteners 115 provides flexibility and/or space for wiring, electronics, centering pins, information or identification plates, for instance. Although the weighing device 102 shown in FIG. 9 provides two mounting fasteners, a single fastener or three or more fasteners may be employed, depending on the specific application. Top, bottom, side, and two perspective front views are also provided in FIG. 9.

FIGS. 10-11 illustrate examples of conventional lift assemblies. FIG. 10A is an exploded front perspective view of a conventional lift truck attachment. As shown, the lift truck carriage includes a pair of support brackets 150. A top support rail 152 and a bottom support rail 154 are each secured to and supported by the pair of support brackets 150. Both top and bottom support rails 152, 154 are attachment bearing cross-members mounted such that they extend beyond a front edge of the lift truck masts. Thus, mounting feature 156 secures the lift assembly by mating with the externally placed support rails. FIG. 10B is a front perspective view of an assembled conventional lift truck attachment.

Figures 11A, 11B:
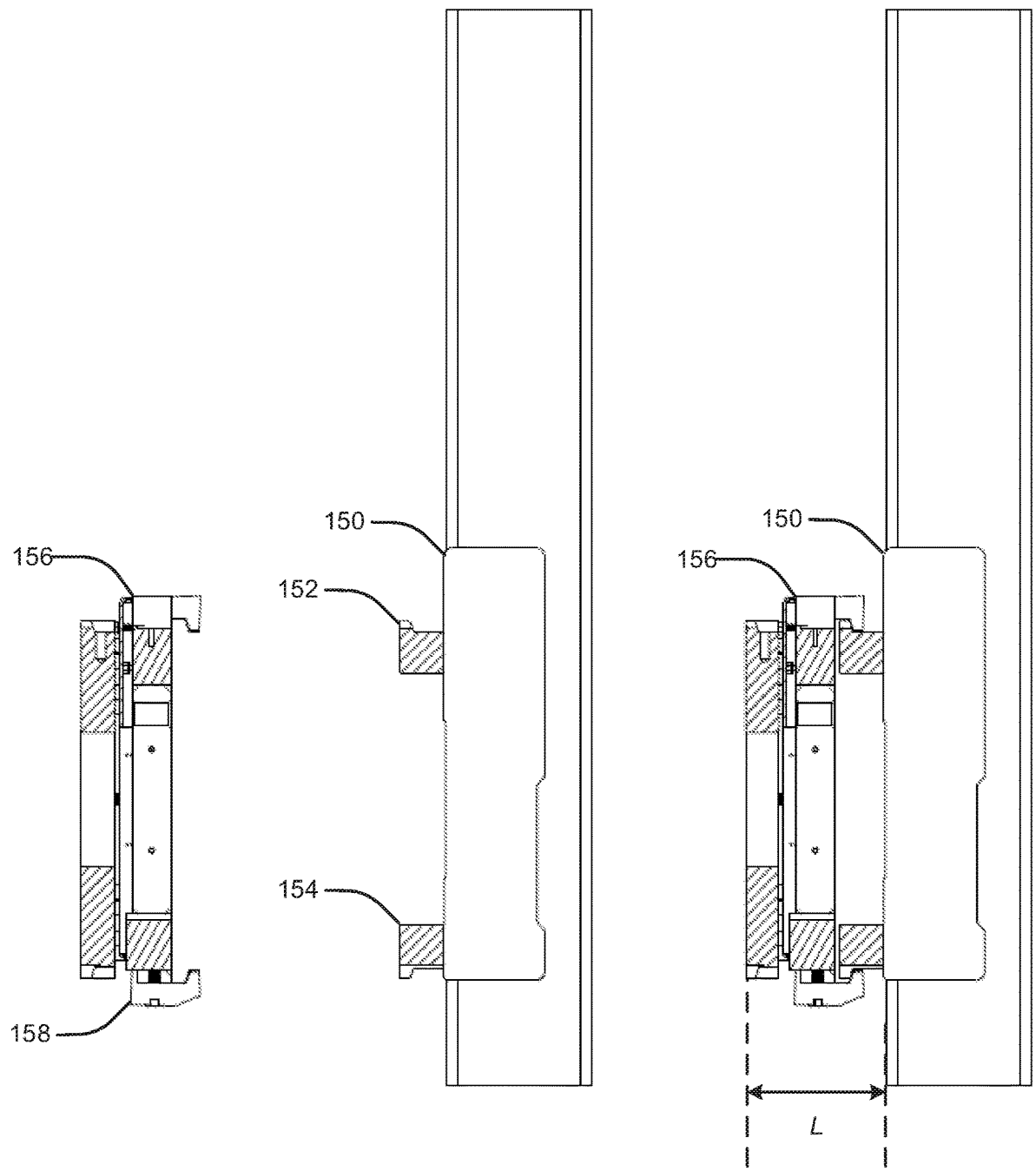
FIGS. 11A and 11B are side views of a conventional lift truck attachment.

FIGS. 11A and 11B are side views of a conventional lift truck attachment. As shown, the lift assembly is secured to the support brackets 150 by mating mounting features 156 and 158 of the lift assembly with support rails 152, 154. As shown, support rails 152, 154 extend beyond the front edge of the masts. Thus, when assembled, the upper and lower mounting features 156 and 158 extend beyond the front edge of the masts, such that the effective distance between the lift truck masts and the external surface of the lift assembly is increased by at least the size of the support rails, as shown by distance L.

In comparison to conventional systems, the lift attachment system 100 as disclosed herein reduces this distance by at least arranging the carriage supports 120, 122 between the lift truck masts 106. This provides an advantage, as the greater displacement of the conventional design reduces the relative effective lifting capacity of the lift truck.

As utilized herein, "and/or" means any one or more of the items in the list joined by "and/or". As an example, "x and/or y" means any element of the three-element set {(x), (y), (x, y)}. In other words, "x and/or y" means "one or both of x and y". As another example, "x, y, and/or z" means any element of the seven-element set {(x), (y), (z), (x, y), (x, z), (y, z), (x, y, z)}. In other words, "x, y and/or z" means "one or more of x, y and z". As utilized herein, the term "exemplary" means serving as a non-limiting example, instance, or illustration. As utilized herein, the terms "e.g.," and "for example" set off lists of one or more non-limiting examples, instances, or illustrations.

While the present method and/or system has been described with reference to certain implementations, it will be understood by those skilled in the art that various changes may be made and equivalents may be substituted without departing from the scope of the present method and/or system. In addition, many modifications may be made to adapt a particular situation or material to the teachings of the present disclosure without departing from its scope. For example, systems, blocks, and/or other components of disclosed examples may be combined, divided, re-arranged, and/or otherwise modified. Therefore, the present method and/or system are not limited to the particular implementations disclosed. Instead, the present method and/or system will include all implementations falling within the scope of the appended claims, both literally and under the doctrine of equivalents.

What is claimed is:

1. A lift truck attachment system comprising:
   a lift truck carriage comprising:
      one or more support brackets;
      an upper carriage support rail secured to the one or more support brackets; and
      a lower carriage support secured to the one or more support brackets and spaced from the upper carriage support rail, wherein the upper carriage support rail and the lower carriage support are arranged between masts of a lift truck; and
   a weighing device comprising:
      a base portion, the base portion configured to be removably secured to one of the upper or lower carriage supports of the lift truck carriage via one or more attachments; and
      a carriage scale removably secured to the base portion, the carriage scale configured to support one or more load handling fixtures.

2. The lift truck attachment system of claim 1, wherein the one or more attachments extend into a space between the masts of the lift truck to secure the weighing device to the lift truck carriage.

3. The lift truck attachment system of claim 1, wherein the one or more attachments comprises an upper attachment and a lower attachment, the upper attachment including a hook to mate with the upper carriage support rail to support the weighing device.

4. The lift truck attachment system of claim 3, wherein the lower attachment including a hook to mate with a rail of the lower carriage support.

5. The lift truck attachment system of claim 4, wherein the hook of the lower attachment is oriented upward to mate with a downwardly oriented rail of the lower carriage support.

6. The lift truck attachment system of claim 4, wherein the hook of the lower attachment is oriented downward to mate with an upwardly oriented rail of the lower carriage support.

7. The lift truck attachment system of claim 1, wherein the one or more attachments are secured to the base by one or more fasteners.

8. The lift truck attachment system of claim 1, wherein the one or more attachments are secured to the base by a weld.

9. The lift truck attachment system of claim 1, wherein the one or more support brackets are dimensioned to fit and move within a channel of the masts.

10. The lift truck attachment system of claim 1, wherein the one or more support brackets include first and second support brackets, the upper carriage support rail being secured to both the first and second support brackets.

11. A lift truck attachment system comprising:
    a lift truck carriage comprising:
       first and second support brackets;
       a carriage support rail secured to the first and second support brackets, wherein the lift truck carriage is dimensioned to fit at least partially between masts of a lift truck; and
    a device assembly comprising:
       a base portion, the base portion configured to be removably secured to the carriage support of the lift truck carriage via one or more attachments; and
       a device removably secured to the base portion, the device configured to support one or more load handling fixtures wherein the one or more attachments extend into a space between the masts of the lift truck to secure the device assembly to the lift truck carriage.

12. The lift truck attachment system of claim 11, wherein the device is a carriage scale to measure a load supported by the one or more load handling fixtures.

13. A lift truck attachment system comprising:
a lift truck carriage comprising:
one or more support brackets;
an upper carriage support secured to the one or more support brackets; and
a lower carriage support secured to the one or more support brackets and spaced from the upper carriage support, wherein the lift truck carriage is dimensioned to fit at least partially between masts of a lift truck; and
a weighing device comprising:
a base portion, the base portion configured to be removably secured to one of the upper or lower carriage supports of the lift truck carriage via two or more upper fasteners and one or more lower fasteners wherein the two or more upper fasteners include a hook to mate with the upper carriage support to support the weighing device; and
a carriage scale removably secured to the base portion, the carriage scale configured to support one or more load handling fixtures.

14. The lift truck attachment system of claim 13, wherein the two or more upper fasteners and one or more lower fasteners extend into a space between the masts of the lift truck to secure the weighing device to the lift truck carriage.

15. The lift truck attachment system of claim 13, wherein the two or more upper fasteners and one or more lower fasteners are secured to the base by one or more fasteners oriented through one or more holes in the front of the base.

16. The lift truck attachment system of claim 13, wherein the two or more upper fasteners are arranged on the base to accommodate one or more of wiring, electronics, centering pins, information or identification plates for the carriage scale.

17. The lift truck attachment system of claim 13, wherein the upper carriage support includes a rail to support the weighing device.

18. The lift truck attachment system of claim 13, wherein the one or more lower fasteners includes a hook to mate with a rail of the lower carriage support.

19. The lift truck attachment system of claim 18, wherein the hook of the one or more lower fasteners is oriented upward to mate with a downwardly oriented rail of the lower carriage support.

20. The lift truck attachment system of claim 13, wherein the one or more support brackets are dimensioned to fit within a channel of the masts.

\* \* \* \* \*